UNITED STATES PATENT OFFICE.

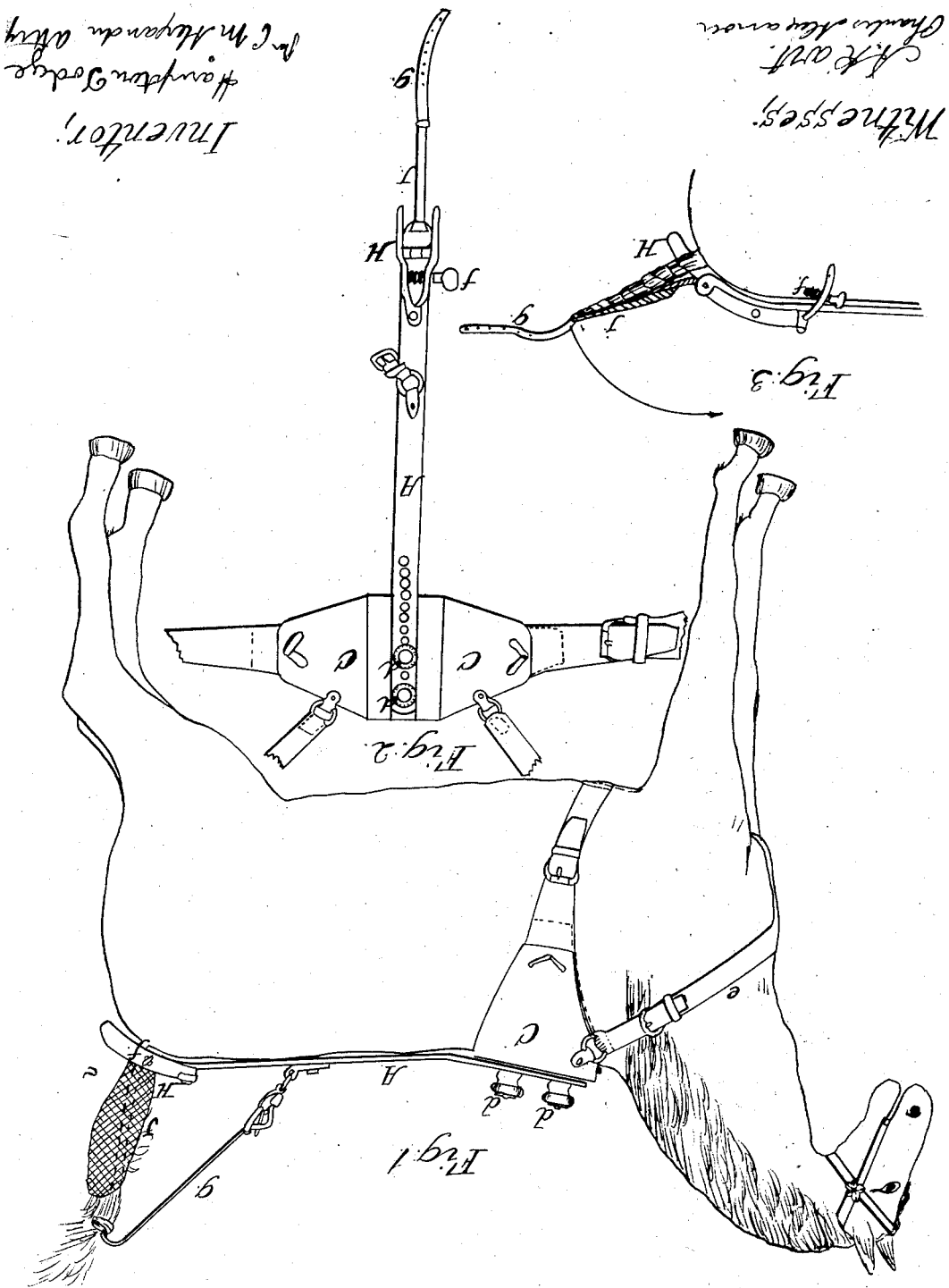

HAMPTON DODGE, OF BUFFALO, NEW YORK.

IMPROVEMENT IN APPARATUS FOR NICKING HORSES.

Specification forming part of Letters Patent No. 37,904, dated March 17, 1863.

*To all whom it may concern:*

Be it known that I, HAMPTON DODGE, of the city of Buffalo, in the State of New York, have invented certain new and useful improvements in apparatus for holding a horse's tail in position during the process of nicking; and I hereby declare that the following is a true and exact description of the same, reference being had to the accompanying drawings, and to the letters of reference marked thereon.

In the annexed drawings, the Figure 1 represents a horse with the apparatus in position.

A, Fig. 2, consists of a metallic plate, designated by that letter, and which extends from the root of the horse's tail to the withers, where it rests upon a metal plate formed somewhat in the shape of a saddle. This saddle, marked C, has two screw-bolts, which pass through holes in A and are kept in place by the taps $dd$. A has a number of holes in it, so that the saddle can be moved backward or forward, and thus adapted to the length of the horse. To the skirts of the saddle C are attached two straps of leather or other suitable material, which are sufficiently long to overlap each other, and are secured together by a buckle. Two similar straps are fastened to rings placed in front of the skirts of C, which rings pass through eyes secured by bolts to the skirts. These straps are fastened to the breast-strap $e$ by buckles. The opposite end of the metallic strap or plate A extends to the root of the horse's tail, and is hinged at that point, marked $f$, to a bar of wood, $j$, of suitable length (see Fig. 2) to support the tail of the horse. From the top of this bar, marked in dotted lines, a leather strap, marked $g$, is extended, and secured to a ring on A, and fastened by a buckle to a short strap attached to the ring.

H represents the crupper-bars, which consist of two prongs, attached to A by a bolt, and, extending below the tail, serve to keep the plate A in position. Between the upper end of the crupper-bars H and the hinge $f$ is a screw-bolt, passing through the two prongs, so that they can be thrown farther apart or drawn together at pleasure.

The operation of my apparatus is simple. As soon as the cords in the horse's tail are cut the tail is fastened to the hinged bar $j$, to which the strap $g$ is already attached. $g$ is buckled then to the ring on the plate A, and the tail elevated to the required degree.

The advantages resulting from my mode of nicking are numerous. It is less cruel than the old method, for the tail, being always kept in one position, the wounds inflicted heal in half the time. The pulleys and weights used in the old system are apt to irritate or open the incisions made in the cords of the tail whenever the horse moves.

Having thus described my invention, what I claim and desire to secure by Letters Patent, is—

1. The saddle C, in connection with the metal plate A, for the purpose herein set forth.

2. The hinged bar $j$, for the purpose specified.

3. The strap $g$, the bar $j$, and the crupper-bars H, arranged as and for the purpose herein set forth.

In testimony that I adopt the foregoing as my own, I hereby affix my signature in the presence of two witnesses.

HAMPTON DODGE.

Witnesses:
HENRY FLANAGAN,
CHARLES GARDNER.